US012568165B2

(12) United States Patent
Dreiling et al.

(10) Patent No.: US 12,568,165 B2
(45) Date of Patent: Mar. 3, 2026

(54) NON-TERRESTRIAL NETWORK CONNECTION ICON

(71) Applicant: T-Mobile USA, Inc., Bellevue, WA (US)

(72) Inventors: Ryan P. Dreiling, Shawnee, KS (US);
Derrick L. Ives, North Bend, WA (US);
Thomas P. Lucht, Seattle, WA (US);
Mehul Shah, Bellevue, WA (US);
Helen Wang, Bellevue, WA (US)

(73) Assignee: T-Mobile USA, Inc, Bellevue, WA (US)

(*) Notice: Subject to any disclaimer, the term of this patent is extended or adjusted under 35 U.S.C. 154(b) by 158 days.

(21) Appl. No.: 18/507,018

(22) Filed: Nov. 10, 2023

(65) Prior Publication Data

US 2025/0159069 A1 May 15, 2025

(51) Int. Cl.
*G06F 3/04817* (2022.01)
*H04M 1/724* (2021.01)

(52) U.S. Cl.
CPC ........ *H04M 1/724* (2021.01); *G06F 3/04817* (2013.01)

(58) Field of Classification Search
None
See application file for complete search history.

(56) References Cited

U.S. PATENT DOCUMENTS

| | | | |
|---|---|---|---|
| 5,061,958 A | 10/1991 | Bunker et al. | |
| 6,370,126 B1 | 4/2002 | De et al. | |

| | | | |
|---|---|---|---|
| 6,567,662 B1 * | 5/2003 | Swanchara, III | H04B 7/18563 |
| | | | 370/316 |
| 6,587,788 B1 | 7/2003 | Green | |
| 7,031,702 B2 | 4/2006 | Karabinis et al. | |
| 7,039,400 B2 | 5/2006 | Karabinis et al. | |
| 7,631,270 B2 | 12/2009 | Cunningham et al. | |
| 7,756,485 B2 | 7/2010 | Paas et al. | |
| 8,285,855 B2 | 10/2012 | Lyndersay et al. | |
| 8,463,325 B2 | 6/2013 | Marui et al. | |
| 8,732,604 B2 | 5/2014 | Okamoto et al. | |
| 9,405,972 B2 | 8/2016 | Moeglein et al. | |
| 9,490,892 B2 | 11/2016 | Lamarca et al. | |
| 9,686,008 B2 | 6/2017 | Atkinson | |
| 9,998,207 B1 | 6/2018 | Coleman et al. | |
| 10,051,338 B2 | 8/2018 | Medina et al. | |
| 10,373,017 B2 | 8/2019 | Hendlin et al. | |

(Continued)

FOREIGN PATENT DOCUMENTS

| | | |
|---|---|---|
| CN | 107153495 B | 6/2020 |
| EP | 0989700 B1 | 3/2006 |

(Continued)

*Primary Examiner* — Tuan S Nguyen
(74) *Attorney, Agent, or Firm* — Perkins Coie LLP

(57) ABSTRACT

Techniques, apparatuses, and systems for implementing a non-terrestrial network connection icon are disclosed. A first icon indicative of a connection to a satellite network is displayed at a status portion of a display of a mobile device in response to determining that the mobile device is connected to the satellite network. In aspects, the status portion does not include an indication of a signal quality of the connection to the satellite network while the first icon is displayed. Instead, the status portion can display a second icon indicative of one or more features that are available or not available on the satellite network.

20 Claims, 8 Drawing Sheets

(56) References Cited

U.S. PATENT DOCUMENTS

| | | | |
|---|---|---|---|
| 10,558,323 | B1 | 2/2020 | Von Dehsen et al. |
| 10,601,684 | B2 | 3/2020 | Hashmi et al. |
| 10,728,352 | B2 | 7/2020 | Song et al. |
| 10,984,791 | B2 | 4/2021 | Arora et al. |
| 11,082,973 | B2 | 8/2021 | Wang et al. |
| 11,171,719 | B2 | 11/2021 | Cui et al. |
| 11,540,189 | B2 | 12/2022 | Cui et al. |
| 11,665,745 | B2 | 5/2023 | Sengupta et al. |
| 11,696,189 | B2 | 7/2023 | Xu et al. |
| 2006/0026271 | A1 | 2/2006 | Julia et al. |
| 2010/0271951 | A1 | 10/2010 | Dujardin et al. |
| 2010/0285785 | A1* | 11/2010 | Wang ............... H04M 1/72469 |
| | | | 455/418 |
| 2015/0189070 | A1 | 7/2015 | Baker |
| 2020/0007410 | A1 | 1/2020 | Walsh |
| 2021/0367661 | A1* | 11/2021 | Ravishankar ...... H04B 7/18519 |
| 2021/0385675 | A1 | 12/2021 | Määttänen et al. |
| 2022/0030511 | A1 | 1/2022 | Wang et al. |
| 2022/0109496 | A1 | 4/2022 | Shrestha et al. |
| 2022/0256631 | A1 | 8/2022 | Jain et al. |
| 2022/0322263 | A1 | 10/2022 | Sengupta et al. |
| 2023/0047987 | A1 | 2/2023 | Tseng et al. |
| 2023/0078360 | A1 | 3/2023 | Tabor |
| 2023/0121634 | A1 | 4/2023 | Shrestha et al. |
| 2023/0217310 | A1 | 7/2023 | Zhang et al. |
| 2023/0247506 | A1 | 8/2023 | Xu et al. |
| 2023/0308538 | A1* | 9/2023 | Caro ...................... H04W 4/90 |
| 2023/0328171 | A1* | 10/2023 | Caro ................. H04M 1/72418 |
| | | | 455/418 |

FOREIGN PATENT DOCUMENTS

| | | |
|---|---|---|
| EP | 1834251 A2 | 9/2007 |
| EP | 1976240 B1 | 11/2009 |
| KR | 102278686 B1 | 7/2021 |
| WO | 2014048344 A1 | 4/2014 |
| WO | 2021146592 A1 | 7/2021 |
| WO | 2021221736 A2 | 11/2021 |

* cited by examiner

Wireless Device 202

Device Settings App 208

Comm Logic 206

Satellite Network 204

Receive network information 210

Request connection to network 212

Receive network information 214

Determine network type 216

Determine associated provider 218

Determine device settings 220

Configure device based on settings 222

NON-TERRESTRIAL NETWORK CONNECTION ICON

BACKGROUND

Current wireless communications systems (e.g., fifth-generation mobile network (5G)) utilize base stations to communicate with a user equipment. Base stations can be located at the surface of the Earth and support telecommunications coverage in a surrounding area. When in a coverage region of the base station, the user equipment can connect with the base station to communicate data through the network. Currently, the sixth-generation mobile system standard (6G) is under development. In contrast to 5G, 6G enables the user equipment to communicate directly with an orbiting satellite. The user equipment can connect to the satellite when within a coverage region of the satellite. In general, a satellite can provide a larger coverage region and can more easily provide coverage to remote locations. Accordingly, network providers are utilizing non-terrestrial networks to increase coverage and provide improved networks.

BRIEF DESCRIPTION OF THE DRAWINGS

Detailed descriptions of implementations of the present invention will be described and explained through the use of the accompanying drawings.

Figure 1:
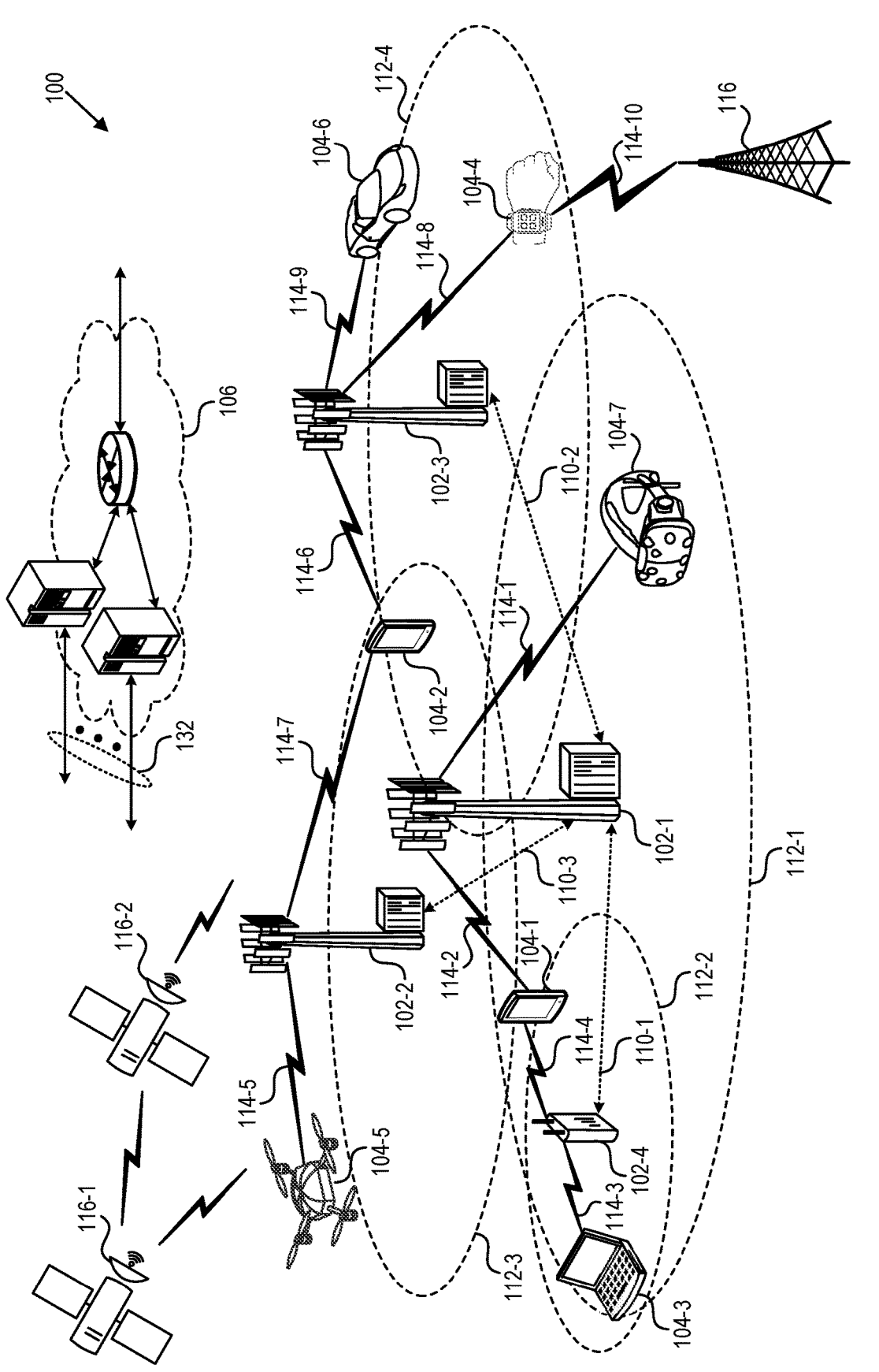
FIG. 1 illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

New generations of wireless communication, such as 6G, utilize satellites to improve network coverage. Given that satellites are not bound to the surface of the Earth, satellites can provide a larger coverage region than base stations and more easily provide coverage in remote locations. As a consequence of this increased coverage region, a greater number of users may compete for communication resources provided by the satellite networks, thereby increasing congestion. This congestion can be worsened by the limited wireless resources that are provided by these networks. For example, satellite networks can be difficult or costly to implement, resulting in these networks having decreased bandwidths or greater latency. Thus, satellite networks can be resource-constrained due to increased competition for limited communication resources.

Given that satellite networks and terrestrial networks have different capabilities, users can benefit from knowing the type of network to which they are connected. For example, satellite networks can be more resource-constrained than terrestrial networks implemented through surface-bound base stations and thus, mobile network providers can choose to disable some wireless services on satellite networks. For example, mobile network providers may choose to disable message, voice call, or data services on satellite networks. To indicate the type of network to which a wireless device is connected, the wireless device can provide an indication of a connection to a satellite network when connected with a satellite network. The indication of the connection to the satellite network can be provided through visual, auditory, or haptic feedback. As a specific example, the connection to the satellite network can be indicated by the display of a satellite on the display of the wireless device.

The icon indicating the connection to the satellite network can be displayed within a status portion of the display of the wireless device. The status portion can be reserved for indicating the status of the device or one or more capabilities of the wireless device. For example, the status portion can indicate the charge remaining within a battery of the wireless device, one or more wireless technologies enabled on the wireless device (e.g., Wi-Fi, Bluetooth, cellular, near-field communication (NFC)), a connection to one or more wireless networks (e.g., Wi-Fi, cellular, Bluetooth), and so on. In some embodiments, the status portion is a spatially constrained portion of the wireless device (e.g., in an upper right corner). As a result, the icon indicative of the connection to the satellite network can be limited in size to fit within the status portion.

The wireless device can further provide an indication of one or more additional details relating to the wireless device. Previous wireless devices connected to terrestrial networks can indicate a quality of the connection to the terrestrial network. For example, the wireless device could present a certain number of bars based on a quality of the signals received from the terrestrial network. In contrast to terrestrial networks, the signal strength between a wireless device and a satellite network can be less variable, thus becoming less useful to indicate to the user. Instead, as discussed above, the user may benefit from knowing which services are enabled or disabled on the satellite network. To provide this information to the user, an additional icon indicative of one or more wireless services that are enabled or disabled on the satellite network can be displayed. As specific examples, the additional icon can indicate whether messaging services (e.g., a Short Message Service (SMS), Rich Communication Service (RCS), Multimedia Messaging Service (MMS)), voice call services, data services, emergency services, or any other wireless services are enabled or disabled on the satellite network.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Configuring a Device for Connection to a Non-Terrestrial Network

Figure 2:
FIG. 2 illustrates a method for configuring device settings when connecting with a satellite network in accordance with aspects of the present technology.

FIG. 2 illustrates a method for configuring device settings when connecting with a satellite network in accordance with aspects of the present technology. Although illustrated in a particular configuration, one or more operations of the method 200 may be omitted, repeated, or reorganized. Additionally, the method 200 may include other operations not illustrated in FIG. 2—for example, operations detailed in one or more other methods described herein.

As illustrated, a wireless device 202 (e.g., an example of the wireless device 104 of FIG. 1) can be capable of communicating with different network types. For example, the wireless device 202 can connect with terrestrial networks (e.g., a 3G, LTE, 4G, 5G, or other terrestrial network) or non-terrestrial networks. Terrestrial networks can be implemented through any number of base stations located at the surface of the Earth. The terrestrial network can include a home terrestrial network, one or more partnered terrestrial networks, and one or more non-partnered terrestrial networks. The home terrestrial network can have an MCC and MNC that are the same as the MCC and MNC indicated within an international mobile subscriber identity (IMSI) of the wireless device 202. The partnered terrestrial networks can have a partnership agreement with the home mobile network to provide roaming services to the wireless device 202 within a coverage area of the partnered terrestrial networks. The non-partnered terrestrial networks may not have a partnership agreement in place with the home terrestrial network but may still provide some limited services to the wireless device 202, such as emergency services, within a coverage region of the non-partnered terrestrial networks.

In contrast, satellite networks (or non-terrestrial networks) can be implemented through at least one satellite orbiting the Earth. As illustrated in FIG. 2, the wireless device 202 communicates with at least one satellite network 204. In aspects, the satellite network 204 includes a satellite network provided by a same mobile network provider as the home terrestrial network or having a partnership agreement with the home terrestrial network. Thus, the satellite network 204 can provide wireless communication services to the wireless device 202 within a coverage region of the satellite network 204. In aspects, non-partnered satellite networks can provide only limited services to the wireless device 202. As a result, non-partnered satellite networks can be treated similarly to non-partnered terrestrial networks in that the wireless device 202 generally will not attempt to connect with non-partnered networks when requesting non-emergency services.

The wireless device 202 includes communication logic 206 capable of controlling the transmission of signaling to a communications network (e.g., the satellite network 204 or a terrestrial network) and the reception of signaling from the communication network using a wireless transceiver. The communication logic 206 can be implemented in hardware, software, or firmware. In aspects, the communication logic 206 can process the signals received at the wireless transceiver in accordance with a communication technology. For example, the communication logic 206 can analyze system information received from available networks to determine if a network is available to provide a wireless communication service to the wireless device 202. In response to determining that a network is available to provide the network, the communication logic 206 can request to connect to the available network such that the available network can provide a wireless service to the wireless device.

The communication logic 206 can provide network information (e.g., located within system information blocks broadcast by proximate networks) to a device settings application 208 responsible for configuring the device to have particular device settings with which the wireless device 202 is to comply when connected with the available network. The device settings application 208 can utilize information about the available network to determine particular device settings for the wireless device 202 when the wireless device 202 is connected to the available network. The device settings application 208 can retrieve the device settings from device configuration data. The device configuration data can store sets of device settings with which the wireless device 202 is to comply when connected to respective networks associated with respective entries of network information in the device configuration data. The device settings can provide the wireless device 202 permission to request one or more wireless services from a network, prevent the wireless device 202 from requesting one or more wireless services from the network, or adjust a visual, auditory, or haptic characteristic of the wireless device 202. In some cases, the device configuration data can be associated with a particular mobile network provider to differentiate between sets of device settings with which the wireless device is to comply when connected to the different networks provided by the mobile network provider. In some cases, the device configuration data can include device settings associated with different types of networks (e.g., non-terrestrial networks, terrestrial networks, generations of these networks, and so on) such that the device settings application 208 can use the device configuration data to determine the device settings with which the wireless device 202 is to comply when connected to a particular type of network.

At 210, the wireless device 202 can receive broadcast information related to and broadcasted by a proximate network (e.g., a network whose coverage area includes the location of the wireless device). As illustrated, the satellite network 204 transmits network information that is received by the wireless device 202. For example, the satellite network 204 can transmit a PLMN code allocated to the satellite network 204 within system information blocks broadcast by the satellite network 204. The network information related to the satellite network 204 can be broadcast repeatedly at predetermined intervals. The wireless device 202 can receive the network information from the satellite network 204 when within a coverage region of the satellite network 204. For example, the communication logic 206 can tune a receiver of the wireless device 202 to receive the network information from the satellite network 204. If the wireless device 202 is outside of the coverage region of the satellite network 204, the wireless device 202 may be unable to receive the network information.

The communication logic 206 can analyze the network information to select a network to which the wireless device 202 is to connect. The network information can be analyzed at least once every predetermined period of time to enable network selection/re-selection. As a specific example, network information can be analyzed at least once every six minutes to enable network selection/re-selection once every six minutes.

The communication logic 206 can compare the network information to one or more lists of approved networks to which the wireless device 202 is approved to connect. In aspects, the approved networks can include a home terrestrial network of the wireless device 202 and at least one partnered network partnered with the home network to allow the wireless device 202 to roam on the partnered network. In some cases, the partnered network can include a partnered satellite network, such as the satellite network 204. The information associated with one or more of the approved networks can be stored in a list of approved mobile networks. Thus, the network information can be compared to the PLMN code of the home network and one or more PLMN codes of partnered networks to determine if the network information is associated with one or more approved networks. If so, the wireless device 202 can determine that an approved network is available to the wireless device 202.

At 212, the wireless device 202 can initiate a wireless access request to an approved network that is available to provide the wireless communication service. The wireless access request can be initiated in response to determine that an approved network is available to provide the wireless communication service. The wireless access request can be initiated by performing at least a portion of a network selection/re-selection procedure. For example, network information received from the satellite network 204 can be used to determine the satellite network 204 as an approved network. As a result, the wireless device 202 can initiate the wireless access request to the satellite network 204 to request the satellite network 204 to provide the wireless communication service to the wireless device 202. In response, the wireless device 202 can connect to the satellite network 204 such that the satellite network 204 provides the wireless service (e.g., message, call, data, or other services) to the wireless device 202.

At 214, the communication logic 206 can provide an indication of the network information to the device settings application 208. In some cases, the communication logic 206 only provides the device settings application 208 the indication of the network information once it is determined that the wireless device 202 will attempt to connect to the network. For example, the network information can be indicated to the device settings application 208 once the satellite network 204 is determined as an approved network capable of providing the wireless service. In some cases, the indication of the network information can be provided to the device settings application 208 after transmission of the network connection request.

At 216, the device settings application 208 determines the type of network with which the wireless device 202 is to connect. The determination can be based on the indication of the network information. In some cases, the network information can include the PLMN code of the network and determine the network type based on the PLMN code. For example, the wireless device 202 can compare the PLMN code to data that associates different PLMN codes with different network types. In doing so, the wireless device 202 can determine that the satellite network 204 is a non-terrestrial network. In response to determining that the satellite network 204 is a non-terrestrial network, the device settings application 208 can determine appropriate device settings for the wireless device 202 when connected with the satellite network 204 at 220.

Alternatively or additionally, at 218, the device settings application 208 can determine a mobile network provider associated with the network information. As discussed above, the satellite network 204 can be partnered with a home network of the wireless device. In some cases, the PLMN code of the satellite network 204 can be allocated to the satellite network 204 by a network provider of the home network of the wireless device 202. For example, the network provider of the home network of the wireless device 202 can have multiple associated PLMN codes, and the network provider can allocate one or more of the PLMN codes to the satellite network 204. The device settings application 208 can compare the PLMN code of the satellite network 204 to data associating PLMN codes with different mobile network providers. In doing so, the device settings application 208 can determine that the network information is associated with the mobile network provider of the home network. After determining that the network information is associated with the mobile network provider, the device settings application 208 can compare the network information to device configuration data that associates entries of network information of networks associated with the mobile network provider to different network types or sets of device settings. In this way, the device settings application 208 can determine appropriate settings for the wireless device 202 when connected with the satellite network 204 at 220.

Although the determinations at 216 and 218 are illustrated and described as being performed at the device settings application 208, in other cases, the determination at 216 and 218 can be performed at the communication logic 206 or any other component and an indication of the determination can be provided to the device settings application 208.

At 220, the device settings application 208 determines one or more device settings associated with the network information. The device settings application 208 can determine the device settings by comparing the network information to a device configuration data. The device configuration data can be maintained on the SIM or on any other storage within or coupled with the wireless device 202. Alternatively, the device settings application 208 can receive the device configuration data from the satellite network or any other wireless network using a receiver of the wireless device 202 and the communication logic 206. In aspects, the device configuration data can include one or more entries of network information, respective network types of respective ones of the entries of network information, or respective device settings associated with the respective ones of the entries of network information. Thus, by comparing the network information to the device configuration data, device settings with which the wireless device 202 is to comply when connected with the satellite network 204 can be determined.

In some embodiments, the device settings are determined after the satellite network 204 is determined to have a particular type that may require particular device settings. For example, the device settings application 208 can determine the device settings with which the wireless device 202 is to comply when connected with the satellite network 204 after determining that the satellite network 204 is a non-terrestrial network. In some cases, the device configuration data can associate a single set of device settings with a network type. In this way, the device settings can be determined by searching for the set of settings corresponding to the network type. In other cases, the device settings can be assigned on a per-network basis such that two different non-terrestrial networks can have different sets of device settings. Thus, the specific network information can be used to determine the appropriate set of device settings with which to comply when connected with the satellite network 204.

In some embodiments, the device settings are determined after the network information is determined to be associated with a particular provider. For example, the satellite network

204 can be allocated a PLMN code (e.g., the satellite network 204 broadcasts the PLMN code) that belongs to a first mobile network provider (e.g., is associated with the first mobile network provider in a PLMN code list) with which a second provider of the satellite network 204 is partnered. In aspects, the second provider of the satellite network 204 can have a partnership agreement with the first mobile network provider such that customers of the first mobile network provider can communicate on the satellite network 204. Given that the network information is associated with the first mobile network provider and allocated, by the first mobile network provider, to the satellite network 204, when the wireless device 202 analyzes the PLMN code of the satellite network 204, it can determine that the PLMN code belongs to the first mobile network provider. The first mobile network provider can allocate PLMN codes to different networks that operate better with different device settings. To accommodate the various sets of device settings associated with the different networks, the first mobile network provider can provide the wireless device 202 with device configuration data that includes various network information associated with respective device settings, and the wireless device 202 can reference the device configuration data once the network information is determined to be associated with the first mobile network provider.

At 222, the device settings application 208 can configure the wireless device 202 in accordance with the device settings determined at 220. Configuring the wireless device 202 in accordance with the device settings can be performed before or after connecting with the satellite network 204. In aspects, the wireless device 202 can be configured such that the wireless device 202 is unable to request one or more wireless services from the satellite network 204. For example, the wireless device 202 can be disabled from requesting voice call or data services from the satellite network 204 due to the reduced resources available on the satellite network. In doing so, not only can network resources be saved by not providing the wireless services, but also network resources can be saved by not having to communicate the connection requests for these services, which can be particularly beneficial in resource-constrained satellite networks. In some embodiments, the device settings can relate to a visual, auditory, or haptic characteristic of the wireless device 202. In this way, configuring the wireless device 202 to comply with the device settings can include adjusting a visual, auditory, or haptic characteristic of the wireless device 202. As specific examples, the wireless device 202 can display an icon indicative of a connection to the satellite network 204 on a display of the wireless device 202, output a sound indicative of a connection to the satellite network 204 using a speaker of the wireless device 202, or actuate a haptic element of the wireless device 202 to produce haptic feedback at the wireless device 202.

Although specific examples are provided, the method 200 can be performed to configure a wireless device 202 in accordance with different device settings. Moreover, the device settings application 208 can configure the wireless device 202 in response to different networks or different types of networks. Thus, from the foregoing, it is appreciated that the particular examples described with respect to FIG. 2 are but some of many possible examples.

Non-Terrestrial Network Connection Icon

Figure 3:
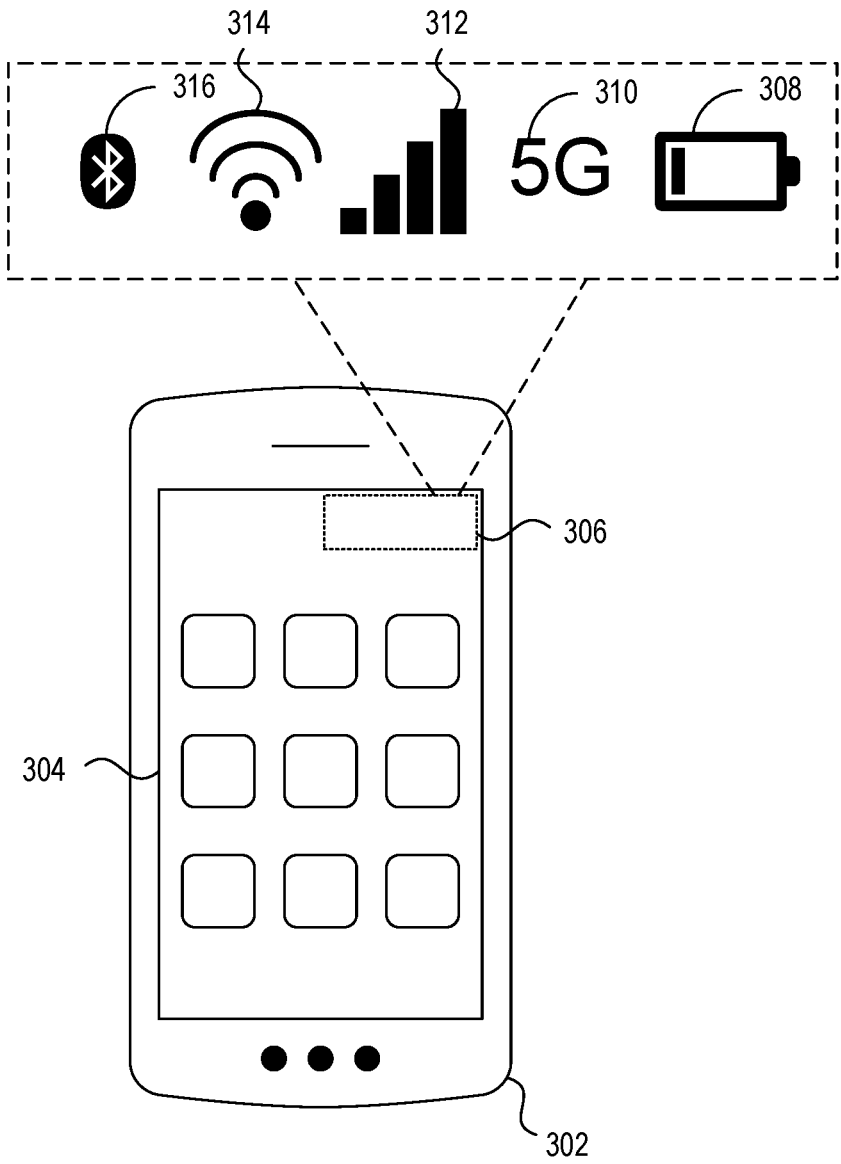
FIG. 3 illustrates a wireless device capable of providing a terrestrial network connection icon.

FIG. 3 illustrates a wireless device 302 (e.g., an example of the wireless device 104 of FIG. 1) capable of providing a terrestrial network connection icon. The wireless device 302 is illustrated as a mobile phone; however, in aspects, the wireless device 302 can be implemented as any appropriate wireless device. The wireless device 302 includes a display 304 that can be used to visually convey information to a user. The display 304 can be any appropriate display—for example, a liquid-crystal (LCD) display, a light-emitting diode (LED) display, an organic LED (OLED) display, or a quantum dot LED (QLED) display.

A status portion 306 is illustrated at a periphery of the display 304. The status portion 306 can be located at an upper or lower portion of the display 304 or at a left or right portion of the display 304. As illustrated, the status portion 306 is located at the upper right corner of the display 304. In other aspects, the status portion 306 can be located at any other portion of the display (e.g., at a periphery of the display 304 or otherwise). The status portion 306 can include any number of icons that provide information about a status of the wireless device 302. For example, the status portion 306 includes a battery icon 308 indicative of a battery level of the wireless device 302, a terrestrial network connection icon 310 indicative of a connection to a terrestrial network, a signal quality icon 312 indicative of a quality of the connection to the terrestrial network, and one or more wireless connection icons indicative of non-cellular wireless connections of the wireless device 302 (e.g., Wi-Fi connection icon 314 and Bluetooth connection icon 316).

The terrestrial network connection icon 310 can indicate a wireless communication technology used to connect to the terrestrial network. As illustrated, the terrestrial network connection icon 310 is displayed as "5G" to indicate that the wireless device 302 connects to the terrestrial network using 5G communication. In other examples, the terrestrial network connection icon 310 could be displayed as "LTE," "4G," or "3G" to indicate a Long-Term Evolution (LTE), fourth-generation (4G), or third-generation (3G) connection, respectively.

The signal quality icon 312 can indicate signal strength (e.g., measured in decibel-milliwatts (dBm)) of signals communicated between the wireless device 302 and the terrestrial network. Higher signal strength can be indicated with a greater number of bars within the signal quality icon 312. For example, the wireless device 302 can display the signal quality icon 312 containing five bars when a signal strength between the wireless device 302 and the terrestrial network is between −50 dBm and −79 dBm. In contrast, a signal strength between −110 dBm and −120 dBm can result in the signal quality icon 312 being displayed with one bar. The signal strength between the wireless device 302 and the terrestrial network can decrease when distance from the base station increases or when objects obstruct a pathway between the wireless device 302 and the base station. Given that numerous buildings or other structures can be located at the surface of the Earth between the base station and the wireless device 302 and that various base stations of a terrestrial network can be spread out to increase coverage area, the signal quality of a connection between the wireless device 302 and the base station can vary greatly at different locations. The speed at which data can be communicated over the terrestrial network can vary depending on signal quality. Accordingly, the user may wish to know information relating to the signal quality of a connection to the terrestrial network, which can be provided through display of the signal quality icon 312.

Figure 4:
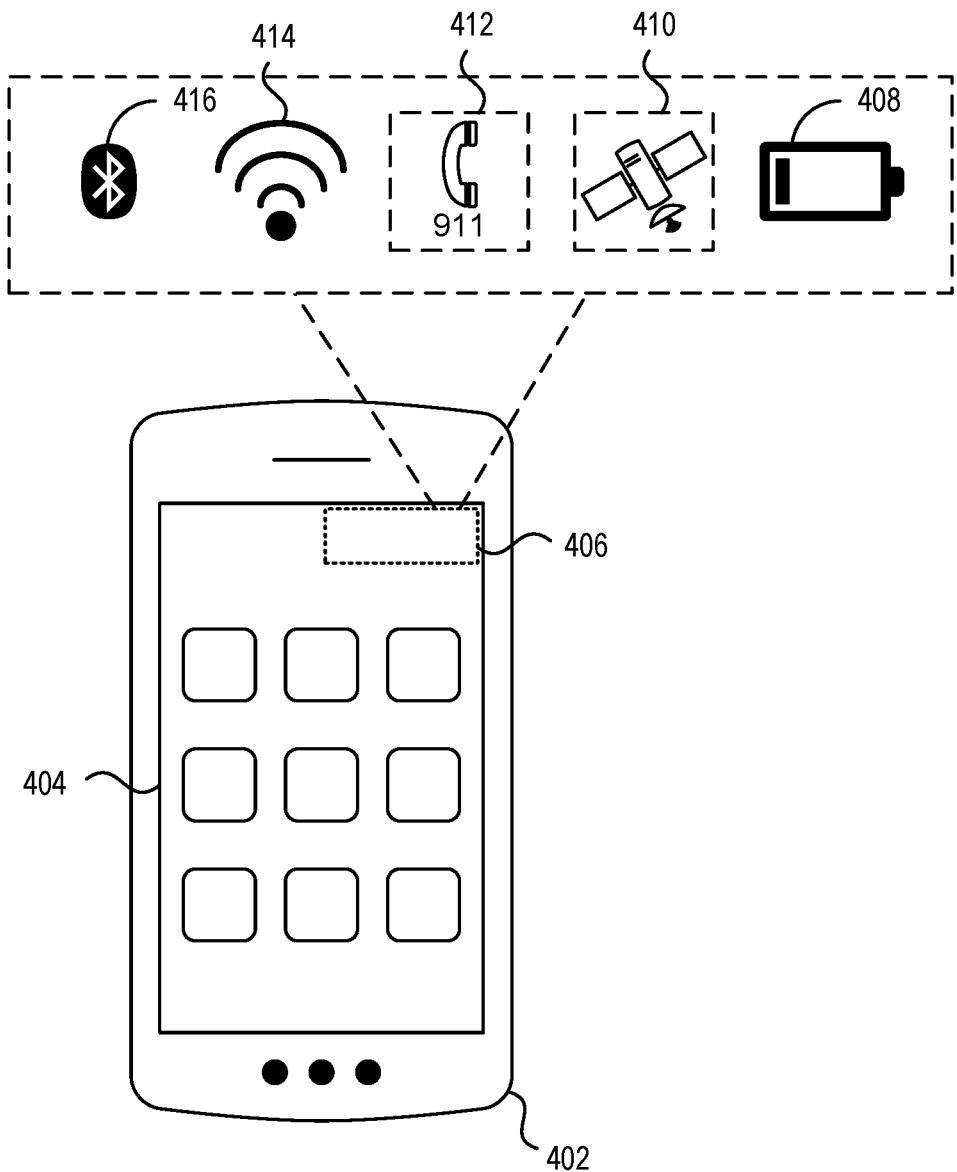
FIG. 4 illustrates a wireless device capable of providing a non-terrestrial network connection icon in accordance with aspects of the present technology.

FIG. 4 illustrates a wireless device 402 (e.g., an example of the wireless device 104) capable of providing a non-terrestrial network connection icon in accordance with aspects of the present technology. The wireless device 402 is illustrated as a mobile phone; however, in aspects, the wireless device 402 can be implemented as any appropriate wireless device. The wireless device 402 includes a display 404, which can be similar to the display 304 described with respect to FIG. 3.

A status portion 406 is illustrated at a periphery of the display 404. Similar to the status portion 306 described with respect to FIG. 3, the status portion 406 can provide information to a user relating to the status of the wireless device 402. The status portion 406 can be located at any location on the display 404. As illustrated, the status portion 406 is located at the upper right corner of the display 404. The status portion 406 can include any number of icons that provide information about a status of the wireless device 402. For example, the status portion 406 includes a battery icon 408 indicative of a battery level of the wireless device 402, a non-terrestrial network connection icon 410 indicative of a connection to a non-terrestrial network, a service availability icon 412 indicative of one or more features that are or are not available on the non-terrestrial network, and one or more wireless connection icons indicative of non-cellular wireless connections of the wireless device 402 (e.g., Wi-Fi connection icon 414 and Bluetooth connection icon 416).

Figure 5:
FIG. 5 illustrates non-terrestrial icons indicative of a connection to a non-terrestrial network in accordance with aspects of the present technology.

The non-terrestrial network connection icon 410 can indicate that the wireless device 402 is connected with a non-terrestrial network. The wireless device 402 can determine that it has connected to the non-terrestrial network using any number of techniques, as discussed above. Portions of the screen can be allocated (e.g., by device manufacturers) to display information that is not related to the status of the wireless device 402. Thus, the non-terrestrial network connection icon 410 can be sized to fit within the status portion 406 of the wireless device 402. Moreover, in some embodiments, the wireless device 402 can be space-constrained to prioritize the portability of the device. Thus, the non-terrestrial network connection icon 410 can be limited in size to fit within a spatially constrained status portion 406. The non-terrestrial network connection icon 410 can be implemented in any number of ways. As illustrated, the non-terrestrial network connection icon 410 depicts a satellite. Possible implementations of the non-terrestrial network connection icon 410 are illustrated in FIG. 5; however, the non-terrestrial network connection icon 410 can be implemented in any number of ways.

In general, the non-terrestrial network connection icon 410 does not indicate a quality of the connection between the wireless device 402 and the non-terrestrial network. For example, given that the non-terrestrial network can utilize satellites orbiting the Earth at great distances, small changes in location of the wireless device 402 at the Earth's surface may not have a great impact on signal quality. Moreover, the overhead nature of the satellites can limit changes in signal quality caused by interference from buildings, trees, and other structures at Earth's surface. As a result, it may not be important to indicate signal quality to the user. Instead, in some embodiments, the non-terrestrial network connection icon 410 can provide a binary indication of a connection between the wireless device 402 and the non-terrestrial network. That is, the non-terrestrial network connection icon 410 can be binary in nature because the non-terrestrial network connection icon 410 indicates that the wireless device 402 is either connected to or disconnected from the non-terrestrial network.

In aspects, some wireless services may not be available when connected to a non-terrestrial network. For example, satellites can provide a greater coverage area compared to terrestrial base stations, and thus, non-terrestrial networks can experience greater congestion. To reduce this congestion, services may be limited on non-terrestrial networks. Moreover, network providers may choose to allocate available bandwidth on the non-terrestrial network to users located in remote areas that are outside the coverage area of terrestrial networks and would otherwise be disconnected. Thus, users within a coverage region of a terrestrial network can have some services disabled on the non-terrestrial network. In yet other aspects, challenges related to communication with distant satellites (e.g., large communication distances, Doppler shifts, and so on) can make it difficult to provide some features on non-terrestrial networks. For example, some non-terrestrial networks may struggle to keep up with bandwidth or latency requirements of some features (e.g., data, streaming, voice calls). Further, non-terrestrial networks can be costly to deploy due to a cost of deploying satellites or maintaining the network. Accordingly, some network operators may require separate or different service plans to make some or all wireless services available when connected to a non-terrestrial network.

Given that some services can be available while others are not available, a user may benefit from an indication of what services are or are not available on the non-terrestrial network to which the wireless device 402 is connected. The service availability icon 412 can provide such an indication. The service availability icon 412 can provide an indication that one or more wireless services are available on the non-terrestrial network or that one or more wireless services are not available on the non-terrestrial network. In contrast to the signal quality icon 312 described with respect to FIG. 3, in aspects, the service availability icon 412 does not indicate a variable quality of a signal between the wireless device 402 and the non-terrestrial network but specific wireless services that are or are not available on the non-terrestrial network. In this way, the service availability icon 412 can provide a binary (e.g., available or not available) indication of services provided on the non-terrestrial network.

The service availability icon 412 can indicate the availability of one or more wireless services, such as messaging services (e.g., short message services (SMS), multimedia services (MMS), rich communication services (RCS)), voice calling services, data services (e.g., data streaming), emergency messaging services (e.g., 911 messaging services), emergency voice calling services (e.g., 911 voice calling services), and so on. As illustrated, the service availability icon 412 indicates that emergency voice calling services are available on the non-terrestrial network. Possible implementations of the service availability icon 412 are illustrated in FIG. 6; however, the service availability icon 412 can be implemented in any number of ways to convey the availability or unavailability of one or more wireless services.

In some embodiments, connection to a non-terrestrial network or the services available or unavailable on the non-terrestrial network can be indicated through any number of other techniques. For example, a portion of the display 404 can glow with a particular color or luminance when the wireless device 402 connects to a non-terrestrial network. As a specific example, the periphery of the display 404 can display a magenta glow when the wireless device 402 connects to a non-terrestrial network. In some cases, an indicator on the display 404 can present a particular color that indicates the connection to the non-terrestrial network or services available or unavailable. For example, a first color (e.g., blue) can indicate that the wireless device 402 is connected to a non-terrestrial network, a second color (e.g., green) can indicate that messaging services are available on the non-terrestrial network, a third color (e.g., red) can indicate that voice calling services are available on the non-terrestrial network, and a fourth color (e.g., yellow) can indicate that data services are available on the non-terrestrial network. In yet other aspects, haptic or auditory feedback can be used to indicate a connection to the non-terrestrial network or services available or unavailable on the non-terrestrial network.

FIG. 5 illustrates non-terrestrial network connection icons 510 indicative of a connection to a non-terrestrial network in accordance with aspects of the present technology. Various examples of the non-terrestrial network connection icons 510 are illustrated. For example, non-terrestrial network connection icon 510-1 depicts a satellite to indicate that the wireless device is connected with a non-terrestrial network. In other examples, the non-terrestrial network connection icon 510-2 depicts "SAT," the non-terrestrial network connection icon 510-3 depicts Earth, and the non-terrestrial network connection icon 510-4 depicts "NT." In general, the non-terrestrial network connection icon can depict something related to a non-terrestrial network. For example, the satellite depicted in the non-terrestrial network connection icon 510-1 and "SAT" in the non-terrestrial network connection icon 510-2 are indicative of a satellite of the non-terrestrial network to which the wireless device connects. The Earth depicted in the non-terrestrial network connection icon 510-3 conveys that the wireless device is connected to a non-terrestrial network if orbiting satellites. In yet another example, the non-terrestrial network connection icon 510-4 depicts "NT," which is derivative of non-terrestrial and can indicate that the wireless device is connected to a non-terrestrial network.

Figure 6:
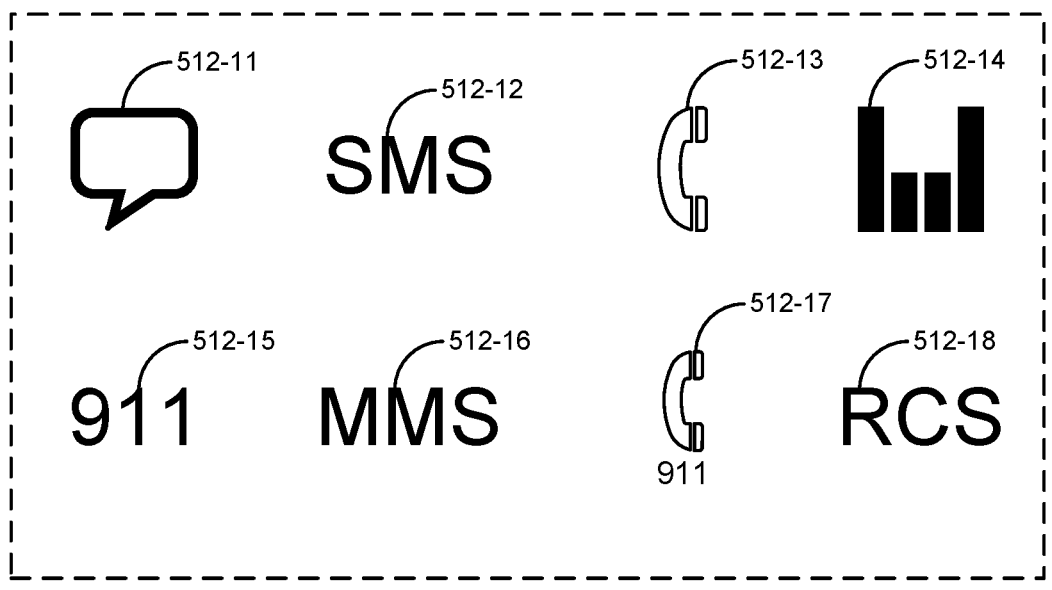
FIG. 6 illustrates non-terrestrial icons indicative of one or more wireless communication features that are or are not available on a non-terrestrial network in accordance with aspects of the present technology.
Figure 6:
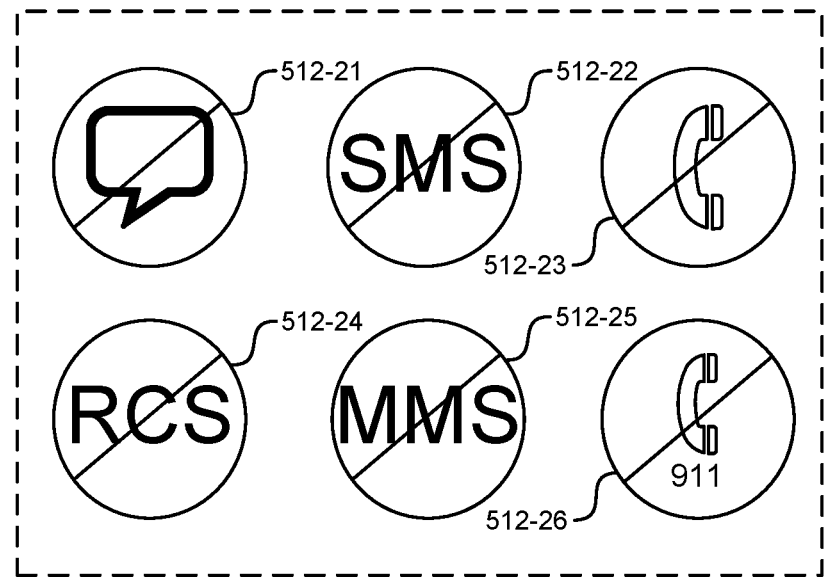

FIG. 6 illustrates available service icons 512 indicative of one or more wireless communication features that are or are not available on a non-terrestrial network in accordance with aspects of the present technology. Various examples of the available service icons 512 are illustrated. Available service icons 512-11 (e.g., available service icon 512-11, available service icon 512-12, available service icon 512-13, and so on) indicate wireless services that are available on the non-terrestrial network. Available service icons 512-2 (e.g., available service icon 512-21, available service icon 512-22, available service icon 512-23, and so on) indicate wireless services that are not available on the non-terrestrial network. A wireless device can display one or more of the available service icons 512 at one time. For example, the wireless device can display multiple of the available service icons 512-1 to indicate multiple wireless services that are available on the non-terrestrial network or display multiple of the available service icons 512-2 to indicate multiple wireless services that are unavailable on the non-terrestrial network. As another example, the wireless device can display at least one of the available service icons 512-1 and at least one of the available service icons 512-2 to indicate at least one wireless service that is available and at least one wireless service that is unavailable on the non-terrestrial network.

Various examples of the available service icons 512-1 are illustrated. Specifically, available service icon 512-11 depicts a graphic of a message to indicate that messaging services (e.g., SMS, MMS, RCS) are available on the non-terrestrial network. In some cases, the available service icons 512-1 can indicate particular types of messaging that are available on the non-terrestrial network. For example, MMS or RCS can require greater amounts of bandwidth. Thus, available service icon 512-12, which depicts "SMS," can indicate that SMS is available on the non-terrestrial network (e.g., but MMS or RCS is unavailable). Similarly, available service icon 512-16, which depicts "MMS," can indicate that MMS is available, and available service icon 512-18, which depicts "RCS," can indicate that RCS is available. Available service icon 512-13 depicts a graphic of a phone to indicate that voice calling services are available on the non-terrestrial network. In some cases, only emergency voice calling services (e.g., 911 voice calling) are available. For example, available service icon 512-17, which depicts a phone and the numbers "911," can indicate that emergency voice calling services are available (e.g., but other voice calling services are unavailable). Alternatively or additionally, the available service icon 512-15 can indicate the emergency services (e.g., emergency messaging or emergency voice calling) are available (e.g., but other wireless services are unavailable).

In some embodiments, the available service icons 512 can be implemented as one icon that provides an indication of the availability or unavailability of multiple wireless services. For example, available service icon 512-14 depicts multiple parallel bars, where each bar indicates the availability of a wireless service. While the available service icon 512-14 can appear similar to the signal quality icon 312 described with respect to FIG. 3 in that both have multiple parallel lines, the available service icon 512-14 does not indicate the variable quality of a signal between the wireless device and a non-terrestrial network. Instead, the available service icon can provide a binary indication of the availability or unavailability of wireless services on the non-terrestrial networks. For example, the bars can extend along a dimension to a greater height or a lesser height. A bar of the available service icon 512-14 can extend to the greater height to indicate that a wireless service associated with the bar is available on the non-terrestrial network, and a bar of the available service icon 512-14 can extend to the lesser height to indicate that a wireless service associated with the bar is unavailable on the non-terrestrial network, or vice versa. As a specific example, first, second, third, and fourth bars of the available service icon 512-14 can correspond to messaging services, voice calling services, video calling services, and data services, respectively, when counting from left to right. Thus, the available service icon 512-14 can indicate that message services and data services are available and voice calling services and video calling services are unavailable.

Various examples of the available service icons 512-2, which indicate services that are unavailable on the non-terrestrial network, are also illustrated. Specifically, available service icon 512-21 depicts a crossed-out graphic of a message to indicate that messaging services (e.g., SMS, MMS, RCS) are not available on the non-terrestrial network. Similar indications can be provided for particular types of messaging that are unavailable on the non-terrestrial network. For example, available service icon 512-22, which depicts a crossed-out "SMS," can indicate that SMS is unavailable on the non-terrestrial network. Similarly, available service icon 512-25, which depicts a crossed-out "MMS," can indicate that MMS is unavailable, and available service icon 512-24, which depicts a crossed-out "RCS," can indicate that RCS is unavailable. Available service icon 512-23 depicts a crossed-out graphic of a phone to indicate that voice calling services are unavailable on the non-terrestrial network. In yet another aspect, emergency services may only be provided through messaging or other wireless services (e.g., instead of voice calling) due to non-terrestrial network capabilities. In this way, the available service icon 512-26, which depicts a crossed-out graphic of a phone and the numbers "911," can indicate that emergency services are not provided through voice calling services (e.g., but emergency messaging services are available).

Although particular embodiments and descriptions of the non-terrestrial network connection icon 510 and available service icon 512 are provided, other implementations of these icons are possible. For example, the non-terrestrial network connection icon 510 can be implemented as any icon that conveys a connection of the wireless device to a non-terrestrial network connection. Similarly, the available service icon 512 can be implemented as any icon that conveys the availability of services on the non-terrestrial network connection. Moreover, services available or unavailable on the non-terrestrial network can be indicated through any other type of feedback (e.g., graphical, haptic, auditory), as discussed with respect to providing an indication of a connection to the non-terrestrial network.

Figure 7:
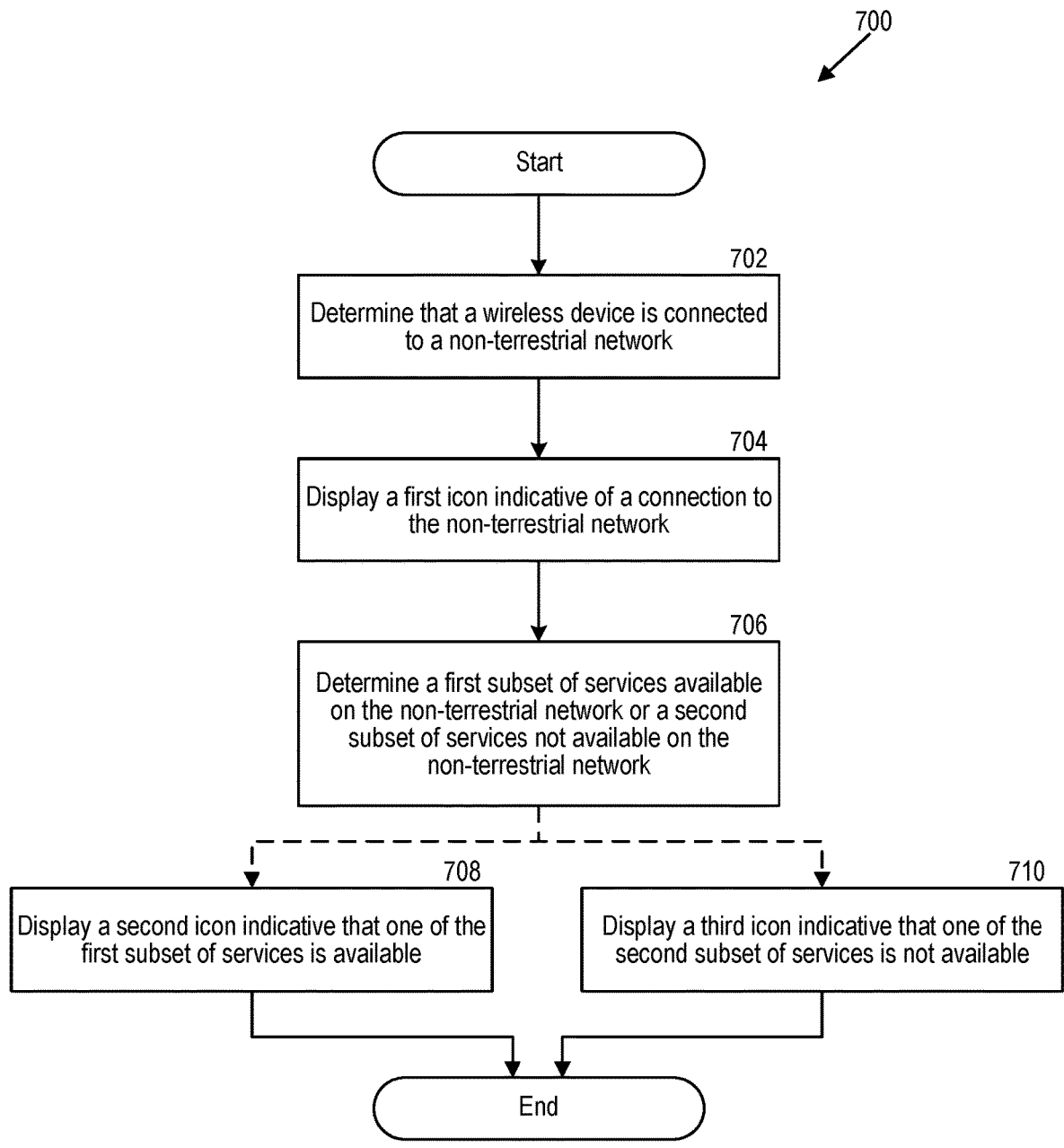
FIG. 7 illustrates a method for providing a non-terrestrial network connection icon in accordance with aspects of the present technology.

FIG. 7 illustrates a method 700 for providing a non-terrestrial network connection icon in accordance with aspects of the present technology. In aspects, the method 700 can be performed at a wireless device. Although illustrated in a particular configuration, one or more operations of the method 700 may be omitted, repeated, or reorganized. Additionally, the method 700 may include other operations not illustrated in FIG. 7—for example, operations detailed in one or more other methods described herein.

At 702, a wireless device is determined to be connected to a non-terrestrial network. For example, the wireless device can initially be connected to a terrestrial network (e.g., a 4G LTE or 5G network). To indicate this connection, the wireless device can display a type of network connection (e.g., 4G LTE or 5G) and a signal quality of the connection to the terrestrial network. The wireless device can connect to an available non-terrestrial network, as discussed above. For example, when the wireless device leaves a coverage region of the terrestrial network, the wireless device can connect to the non-terrestrial network. Various techniques for determining that the wireless device has connected to the non-terrestrial network have been described above.

At 704, a first icon indicative of a connection to the non-terrestrial network can be displayed. For example, the first icon can be displayed on a status portion of the display. The first icon can replace an icon displayed on the wireless device when the wireless device is connected to a terrestrial network. For example, the wireless device can cease displaying an icon indicative of a connection to a terrestrial network (e.g., a 4G LTE or 5G icon) and an icon indicative of the signal quality of the connection when the wireless device is disconnected from the terrestrial network and connected to the non-terrestrial network. Once it is determined that the wireless device is connected to the non-terrestrial network, the first icon indicative of the connection to the non-terrestrial network can be displayed. In aspects, the first icon indicative of the connection to the non-terrestrial network is a binary indication. That is, the first icon merely indicates that the wireless device is connected to the non-terrestrial network or is not connected to the non-terrestrial network, not a quality of the connection to the non-terrestrial network. The signal quality may not vary greatly when the wireless device is connected to the non-terrestrial network. Thus, it may not be necessary to indicate the signal quality of the connection between the wireless device and the non-terrestrial network when the wireless device is connected to the non-terrestrial network. As a result, in some embodiments, when the first icon is displayed, the status portion does not include an indication of a signal quality between the wireless device and the non-terrestrial network.

At 706, a first subset of wireless services available on the non-terrestrial network or a second subset of wireless services not available on the non-terrestrial network is determined. The wireless device can determine which services are available or unavailable on the non-terrestrial network through a number of techniques, as discussed above. For example, in some cases, wireless services can be restricted on the non-terrestrial network to manage bandwidth usage and congestion. In other cases, the usage of wireless services on the non-terrestrial network can be managed under a pricing structure that is different from the usage of wireless services on the terrestrial network. In this way, some wireless services on non-terrestrial networks can be disabled for some users or can require explicit permission from the user to be enabled. Once the services that are available or unavailable on the non-terrestrial network are determined, indications of the services can be displayed to the user.

At 708, a second icon indicative that one of the first subset of services is available can be displayed. For example, the second icon can display a phone if voice calling services are available. The second icon can be displayed within a status portion of the display in which the first icon is displayed. In aspects, the second icon can include multiple graphics indicative of multiple services that are available on the non-terrestrial network. In aspects, the second icon can provide a binary indication of the services available on the non-terrestrial network. That is, the second icon indicates that services are available on the non-terrestrial network, not the quality with which the services can be provided on the non-terrestrial network.

Alternatively or additionally, at 710, a third icon indicative that one of the second subset of services is unavailable can be displayed. For example, the third icon can display a crossed-out phone if voice calling services are unavailable. The third icon can be displayed within a status portion of the display in which the first icon or second icon is displayed. In aspects, the third icon can include multiple graphics indicative of multiple services that are unavailable on the non-terrestrial network. In aspects, the third icon can provide a binary indication of the services that are unavailable on the non-terrestrial network.

Computer System

Figure 8:
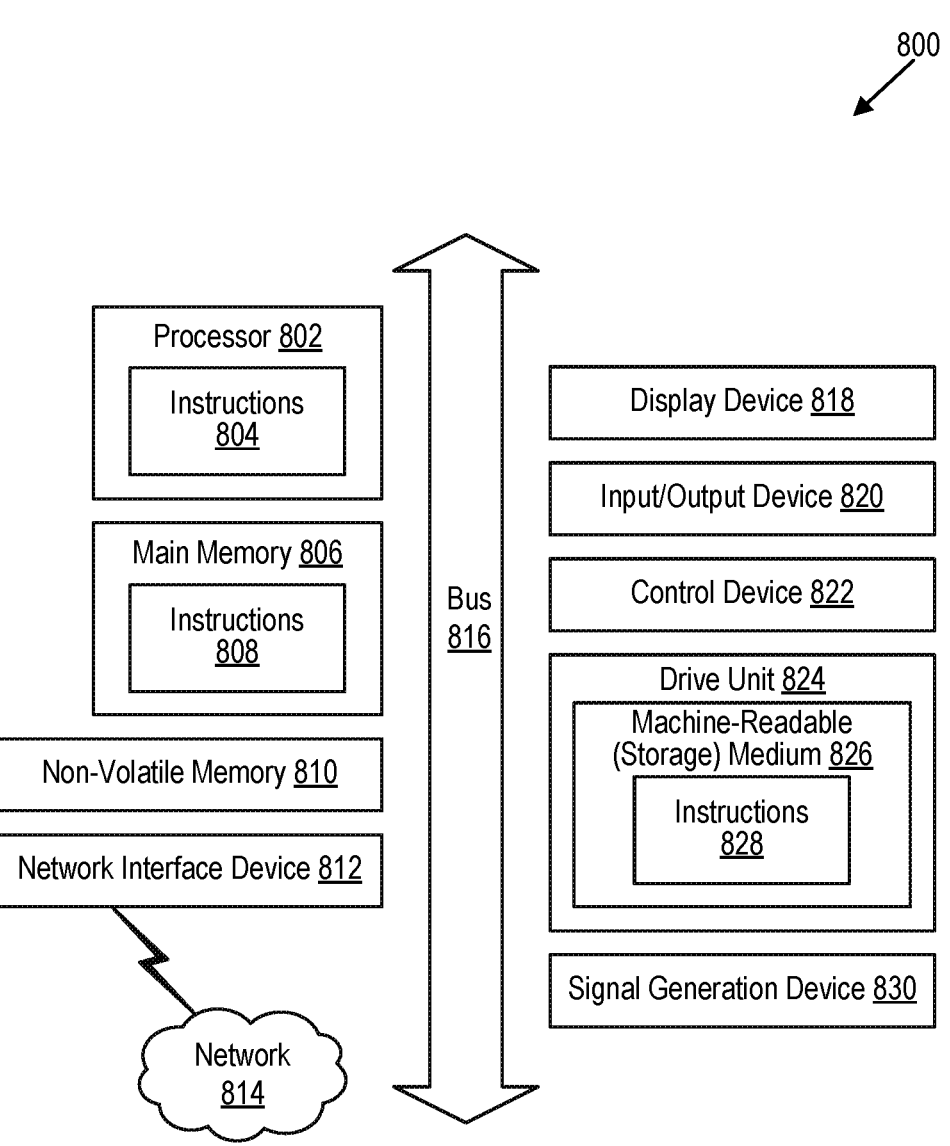
FIG. 8 illustrates components of a computing device in accordance with aspects of the present technology.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded there on, wherein the instructions, when executed by at least one data processor of a system, cause the system to:

determine that a mobile device is connected to a satellite telecommunications network;

in response to the determination that the mobile device is connected to the satellite telecommunications network:

display, on a status portion at a peripheral portion of a display of the mobile device that is used to display a status of the mobile device, a first icon indicative of a connection to the satellite telecommunications network, wherein the status portion does not include an indication of a signal quality of the connection to the satellite telecommunications network while the first icon is displayed, and determine, from one or more non-emergency wireless communications services, a first subset of wireless communications services available on the satellite telecommunications network or a second subset of wireless communications services not available on the satellite telecommunications network; and in response to the determination of the first subset of wireless communications services or the second subset of wireless communications services and at least partially concurrent with displaying the first icon, display, on the status portion, one or more second icons indicative that:

one or more of the first subset of wireless communications services are available on the satellite telecommunications network, or one or more of the second subset of wireless communications services are not available on the satellite telecommunications network.

2. The non-transitory, computer-readable storage medium of claim 1, wherein the instructions, when executed by at least one data processor of a system, further cause the system to:

determine that the mobile device is connected to a terrestrial network;

in response to the determination that the mobile device is connected to the terrestrial network, display, on the status portion, a third icon indicative of a connection to the terrestrial network and a fourth icon indicative of a signal quality of the connection to the terrestrial network;

wherein the determination that the mobile device is connected to the satellite telecommunications network occurs at least partially concurrent with displaying the third icon and the fourth icon; and in response to the determination that the mobile device is connected to the satellite telecommunications network, remove the third icon and the fourth icon from the status portion.

3. The non-transitory, computer-readable storage medium of claim 1, wherein the instructions, when executed by at least one data processor of a system, further cause the system to:

receive, at the mobile device, a public land mobile network code associated with the satellite telecommunications network; and in response to the reception of the public land mobile network code associated with the satellite telecommunications network, determine that the mobile device is connected to the satellite telecommunications network.

4. The non-transitory, computer-readable storage medium of claim 1, wherein:

one or more wireless communications wireless communications services include short message services and at least one of multimedia services and rich communication services;

the first subset of wireless communications services includes the short message services; and the second subset of wireless communications services includes the at least one of the multimedia services and the rich communication services.

5. The non-transitory, computer-readable storage medium of claim 1, wherein:

the one or more wireless communications wireless communications services include message services and voice calling;

the first subset of wireless communications services includes the message services; and the second subset of wireless communications services includes the voice calling.

6. The non-transitory, computer-readable storage medium of claim 1, wherein:

the one or more wireless communications services include at least one of voice calling and message services; and the second subset of services includes the at least one of the voice calling and the message services.

7. The non-transitory, computer-readable storage medium of claim 1, wherein the first icon comprises a depiction of a satellite.

8. The non-transitory, computer-readable storage medium of claim 1, wherein:

the second icon includes multiple parallel bars, each respective bar of the multiple parallel bars is representative of one of the wireless communications services; and a respective dimension of each respective bar of the multiple parallel bars is indicative of the availability of the one of the wireless communications services of which the respective bar is representative.

9. A system comprising:

at least one hardware transitory processor; and at least one non-memory storing instructions, which, when executed by the at least one hardware processor, cause the system to:

determine that a user equipment is connected to a satellite telecommunications network;

in response to the determination that the user equipment is connected to the satellite telecommunications network:

display, on a status portion at a peripheral portion of a display of the user equipment that is used to display a status of the user equipment, a first icon indicative of a connection to the satellite telecommunications network, wherein the presence of the first icon in the status portion indicates that the user equipment is connected to the satellite telecommunications network and an absence of the first icon from the status portion indicates that the user equipment is not connected to the satellite telecommunications network; and determine, from one or more non-emergency wireless communications services, a first subset of wireless communications services available on the satellite telecommunications network or a second subset of wireless communications services not available on the satellite telecommunications network; and in response to the determination of the first subset of wireless communications services or the second subset of wireless communications services and at least partially concurrent with displaying the first icon, display, on the status portion, one or more second icons indicative that:

one or more of the first subset of wireless communications services are available on the satellite telecommunications network, or one or more of the second subset of wireless communications services are not available on the satellite telecommunications network.

10. The system of claim 9, wherein the system is further caused to:

determine that the user equipment is connected to a terrestrial network;

in response to the determination that the user equipment is connected to the terrestrial network, display, on the status portion, a third icon indicative of a connection to the terrestrial network and a fourth icon indicative of a signal quality of the connection to the terrestrial network;

wherein the determination that the user equipment is connected to the satellite telecommunications network occurs at least partially concurrent with displaying the third icon and the fourth icon; and in response to the determination that the user equipment is connected to the satellite telecommunications network, remove the third icon and the fourth icon from the status portion.

11. The system of claim 9, wherein the system is further caused to:

receive, at the user equipment, a public land mobile network code associated with the satellite telecommunications network; and in response to the reception of the public land mobile network code associated with the satellite telecommunications network, determine that the user equipment is connected to the satellite telecommunications network.

12. The system of claim 9, wherein:

the one or more wireless communications services include short message services and at least one of multimedia services and rich communication services;

the first subset of wireless communications services includes the short message services; and the second subset of wireless communications services includes the at least one of the multimedia services and the rich communication services.

13. The system of claim 9, wherein:

the one or more wireless communications features services include message services and voice calling;

the first subset of wireless communications services includes the message services; and the second subset of wireless communications services includes the voice calling.

14. The system of claim 9, wherein:

the one or more wireless communications services include at least one of voice calling and message services; and the second subset of wireless communications services includes the at least one of the voice calling and the message services.

15. The system of claim 9, wherein the first icon comprises a depiction of a satellite.

16. The system of claim 9, wherein:

the second icon includes multiple parallel bars, each respective bar of the multiple parallel bars is representative of one of the wireless communications services; and a respective dimension of each respective bar of the multiple parallel bars is indicative of the availability of the one of the wireless communications services of which the respective bar is representative.

17. A method comprising:

determining that a user equipment is connected to a satellite telecommunications network;

in response to the determination that the user equipment is connected to the satellite telecommunications network:

displaying, on a status portion at a peripheral portion of a display of the user equipment that is used to display a status of the user equipment, a first icon indicative of a connection to the satellite telecommunications network, wherein the presence of the first icon in the status portion indicates that the user equipment is connected to the satellite network and the absence of the first icon from the status portion indicates that the user equipment is not connected to the satellite telecommunications network; and determining, from one or more non-emergency wireless communications services, a first subset of wireless communications services available on the satellite telecommunications network or a second subset of wireless communications services not available on the satellite telecommunications network; and in response to the determination of the first subset of wireless communications services or the second subset of wireless communications services and at least partially concurrent with displaying the first icon, displaying, on the status portion, a second icon indicative that:

one or more of the first subset of wireless communications services are available on the satellite telecommunications network, or one or more of the second subset of wireless communications services are not available on the satellite telecommunications network.

18. The method of claim 17, further comprising:

determining that the user equipment is connected to a terrestrial network;

in response to determining that the user equipment is connected to the terrestrial network, displaying, on the status portion, a third icon indicative of a connection to the terrestrial network and a fourth icon indicative of a signal quality of the connection to the terrestrial network;

wherein determining that the user equipment is connected to the satellite telecommunications network occurs at least partially concurrent with displaying the third icon and the fourth icon; and in response to determining that the user equipment is connected to the satellite telecommunications network, removing the third icon and the fourth icon from the status portion.

19. The method of claim 17, further comprising:

receiving, at the user equipment, a public land mobile network code associated with the satellite telecommunications network; and in response to the reception of the public land mobile network code associated with the satellite network, determining that the user equipment is connected to the satellite telecommunications network.

20. The method of claim 17, wherein:

the one or more wireless communications services include message services and voice calling;

the first subset of wireless communications services includes the message services; and the second subset of wireless communications services includes the voice calling.

* * * * *